United States Patent
Lambert

(10) Patent No.: US 12,174,962 B2
(45) Date of Patent: Dec. 24, 2024

(54) SYSTEM AND METHOD FOR MANAGING COMPATIBILITY OF MODULES OF DATA PROCESSING SYSTEMS

(71) Applicant: Dell Products L.P., Round Rock, TX (US)

(72) Inventor: Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 213 days.

(21) Appl. No.: 18/159,894

(22) Filed: Jan. 26, 2023

(65) Prior Publication Data

US 2024/0256672 A1    Aug. 1, 2024

(51) Int. Cl.
G06F 21/57 (2013.01)
G06F 13/42 (2006.01)
G06F 21/51 (2013.01)

(52) U.S. Cl.
CPC ........ *G06F 21/575* (2013.01); *G06F 13/4282* (2013.01); *G06F 21/51* (2013.01); *G06F 2213/0042* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,308,705 B2 | 12/2007 | Gordy et al. | |
| 7,970,279 B2 | 6/2011 | Dress | |
| 9,331,899 B2 | 5/2016 | Christopher et al. | |
| 9,684,575 B2 | 6/2017 | Breakstone et al. | |
| 10,019,388 B2 | 7/2018 | Long et al. | |
| 10,261,561 B2 | 4/2019 | Chuang et al. | |
| 10,733,116 B2 | 8/2020 | Litichever et al. | |
| 11,029,742 B2 | 6/2021 | Webel et al. | |
| 11,112,846 B2 | 9/2021 | Strach et al. | |
| 2008/0126629 A1 | 5/2008 | Huang | |
| 2009/0300329 A1 | 12/2009 | Naffziger et al. | |
| 2012/0233612 A1* | 9/2012 | Beckett | G06F 8/443 718/1 |
| 2014/0380425 A1* | 12/2014 | Lockett | G06F 21/00 726/4 |
| 2017/0147052 A1 | 5/2017 | Waters et al. | |

(Continued)

OTHER PUBLICATIONS

"DC-MHS R1 Overview," 2022 OCP Global Summit (56 Pages).

(Continued)

*Primary Examiner* — Trang T Doan
(74) *Attorney, Agent, or Firm* — Womble Bond Dickinson (US) LLP

(57) ABSTRACT

Methods and systems for managing operation of data processing systems are disclosed. To manage the operation of the data processing systems, the data processing systems may include a port and a management controller that may selectively takeover the port from the host. When taken over, the management controller may use the port to attempt to obtain data usable to modify the operation of one or more modules of the data processing system. The modules may be modified to resolve incompatibilities between the modules. By resolving incompatibilities, data processing systems hosting incompatible modules may be returned to desired operation.

20 Claims, 6 Drawing Sheets

(56) References Cited

U.S. PATENT DOCUMENTS

2021/0326489 A1* 10/2021 Kee .......................... G06F 13/26
2022/0130432 A1    4/2022 Jayapal et al.

OTHER PUBLICATIONS

Kennedy, Jeff et al., "Peripheral Sideband Tunneling Interface (M-PESTI)," Datacenter—Modular Hardware Systems (DC-MHS) Rev 1.0, Apr. 27, 2022 (50 Pages).
"Why won't the computer wake up when connected over USB," Belkin Official Support, Web Page <https://www.belkin.com/support-article/?articleNum=8130>, accessed on Oct. 17, 2022 (2 Pages).
"Clock Gating for Power Reduction," CoQube Analytics and Services, 2021, Web Page <https://coqube.com/clock-gating-for-power-reduction/>, accessed on Oct. 17, 2022 (12 Pages).
Kennedy, Patrick, "Liquid Cooling Next-Gen Servers Getting Hands-on with 3 Options," ServeTheHome, Aug. 2, 2021, Web Page <https://www.servethehome.com/liquid-cooling-next-gen-servers-getting-hands-on-3-options-supermicro/4/>, accessed on Oct. 17, 2022 (10 Pages).

* cited by examiner

SYSTEM AND METHOD FOR MANAGING COMPATIBILITY OF MODULES OF DATA PROCESSING SYSTEMS

FIELD

Embodiments disclosed herein relate generally to operation management. More particularly, embodiments disclosed herein relate to systems and methods to manage compatibility of modules of data processing systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
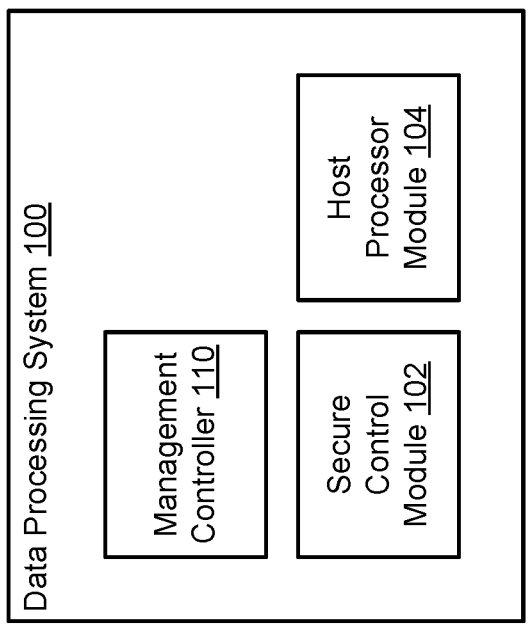
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To provide flexibility in implementation, the data processing systems may be modularized. The modules of the data processing system may provide respective functionalities such as processing functionality, security functionality, management functionality, etc. Thus, specific functionalities may be achieved by incorporating a modules that includes the specific functionalities into a data processing system.

The modules may include any number of hardware components, which may in turn host various software components. The combination of hardware and software components may dictate how each modules will operate.

For the data processing system to operate nominally, the modules may need to cooperate with each other. In other words, the modules may need to cooperate (e.g., thereby being compatible with each other).

In scenarios in which some modules are not compatible, the operation of the modules may be updated through modifying of the software components of the modules. However, the incompatibilities of the modules may be so severe that the data processing system may be unable to successfully operate.

To update the operation of the modules while the data processing system is unable to operate, the data processing system may include a management controller and a port that may be reallocated between use by the management controller and modules of the data processing system. When an incompatibility is identified, the management controller may interrupt a startup and takeover the port. Using the port, the management controller may attempt to obtain update data (e.g., data usable to flash a hardware device of a module) usable to place a first module that is incompatible with a second module into compatibility. After updating, the port may be relinquished to the modules and the startup may be resumed or restarted to complete it. Once the startup is completed, the data processing system may begin to provide desired computer implemented services to its users.

By doing so, a data processing system in accordance with an embodiment may be more likely to be able to provide desired computer implemented services. For example, when initially constructed or when modules are replaced, various modules may not be compatible with one another. By correcting the compatibility of the modules using a management controller which may operate independently of the modules of the data processing system, the inability to operate while an incompatibility between the modules exists of the data processing may not preclude the incompatibility from being remediated. Thus, embodiments disclosed herein may address, among others, the technical problem of compatibility between modules of a modularized system. The disclosed embodiments may address this technical problem by ensuring that corrective action may be taken even when incompatibilities between modules may otherwise prevent desired operation of the data processing system.

In an embodiment, a method for managing operation of a data processing system is provided. The method may include identifying an occurrence of a startup of the data processing system; based on the occurrence and while the startup is being performed: performing a discovery process to identify: a secure control module of the data processing system, and a host processor module of the data processing system; making a first determination regarding whether the secure control module is compatible with the host processor module; in a first instance of the first determination where the secure control module is not compatible with the host processor module: reallocating use of a port of the data processing system to a management controller for the data processing system; making a second determination, using the port while the port is allocated to the management controller, regarding whether update data is available using the port; in a first instance of the second determination where the update data is available via the port: placing the secure control module and the host processor module into compatibility with each other using the update data to obtain an updated secure control module and host processor module pair; and completing the startup using the updated secure control module and host processor module pair.

The method may also include, in a second instance of the first determination where the secure control module is compatible with the host processor module: completing the startup using the secure control module and the host processor module.

The method may further include, in a second instance of the second determination where the update data is not available via the port: aborting the startup; and performing an action set to remediate a lack of availability of the update data.

Reallocating use of the port of the data processing system to the management controller for the data processing system may include modifying a configuration of a multiplexer positioned between a shard communication channel to the port and the management controller, the modified configuration of the multiplexer operably connecting the management controller to the shared communication channel and disconnecting bus controller for of the data processing system from the shared communication channel. The port may be a universal serial bus port.

Making the second determination may include making a third determination regarding whether a device is operably connected to the port; in a first instance of the third determination where the device is operably connected to the port: identifying a type of the device operably connected to the port; and performing an action set based on the type of the device to identify whether the update data is available via the device.

In a first instance of the performance of the action set where the type of the device is a mass storage device, the action set may include scanning (e.g., enumerating and comparing to desired data) data stored on the mass storage device for the update data.

In a second instance of the performance of the action set where the type of the device is a network device, the action set may include operably connecting to a second device using the network device; and scanning data stored on the second device for the update data.

Placing the secure control module and the secure processing module into compatibility with each other may include updating operation of the secure control module using the update data.

In an embodiment, a non-transitory media is provided. The non-transitory media may include instructions that when executed by a processor cause the computer implemented method to be performed.

In an embodiment, a data processing system is provided. The data processing system may include the non-transitory media, a secure control module, a host processor module, and a processor, and may perform the computer implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing system 100. Data processing system 100 may provide the computer implemented services to users of data processing system 100 and/or to other devices (not shown).

To provide the computer implemented services, data processing system 100 may include various hardware components (e.g., processors, memory modules, storage devices, etc.) and host various software components (e.g., operating systems, application, startup managers such as basic input-output systems, etc.). These hardware and software components may provide the computer implemented services via their operation.

Data processing system 100 may be modularized. Hardware devices of data processing system 100 that provide different functionalities may be grouped into interchangeable modules. For example, data processing system 100 may include secure control module 102 and host processor module 104. Host processor module 104 may provide processing functionality (e.g., by including processors, memory modules, field programmable gate arrays and/or other types of special purpose hardware devices, etc.) while secure control module 102 may provide management and/or security functionality (e.g., when data processing system 100 is used as a block in a computing environment such as a data center, and may include hardware components such as field programmable gate arrays and/or other types of special purpose hardware devices, processors, etc.). Data processing system 100 may include any number and type of modules that provide different or similar functionalities.

The modules may be operably connected to one another via any method. For example, a module may be implemented using a circuit card or other types of hardware component interconnection devices. The module may also include one or more connectors that allow the module to interface (e.g., establish operable connections) with other modules.

However, the modules of data processing system 100 may need to be compatible with each other for data processing system 100 to operate nominally (e.g., as expected, desired, in accordance with standards, etc.). In other words, the hardware components may need to operate cooperatively, in accordance with a framework and/or standard, etc. If the hardware components do not operate in this manner, then the data processing system 100 may not operate nominally.

For example, various types of errors in operation data processing system may occur when incompatibilities between modules exist. The errors may include communication errors, component operation errors, misinterpretation (e.g., of data structures) errors, and/or any other types of error in operation. The errors in operation may impair (partially or entirely) the functionalities of data processing system 100. Consequently, data processing system 100 may not provide computer implemented services desired by users when errors in operation occur.

To operate nominally, for example, various hardware components of the modules may need to operate in predetermined manners. To operate in the predetermined manners, the hardware components may need to host particular versions of software (e.g., firmware) that manage the operation of the modules. Different software (e.g., versions) may modify the manner in which the hardware components operate.

For example, over time different versions of software may be developed. However, the hardware components may not include functionality to automatically update their hosted version of the software to a most current version of the software, or a version that automatically places the operation of the hardware device into compatibility with the operation of other hardware devices. Accordingly, the hardware components of any of the modules may not necessarily operate in predetermined manners that ensure compatibility of any of the modules with other modules.

In general, embodiments disclosed herein may provide methods, systems, and/or devices for managing operation of data processing system 100. To manage the operation of data processing system 100, data processing system 100 may automatically identify whether its modules are compatible with one another. When incompatibilities are identified, data processing system 100 may automatically attempt to remediate the incompatibilities. To remediate the incompatibilities, data processing system 100 may attempt to obtain update data usable to update the operation of the modules to place the modules into compatibility with one another.

To provide the above noted functionality, data processing system 100 may include management controller 110. Management controller 110 may be hosted by data processing system (or may be separate), and may be implemented using an independent computing device such as an out-of-band or in-band management component. For example, management controller 110 may be implemented using an embedded computing device that operates independently from the other components of data processing system 100.

Figure 2A:
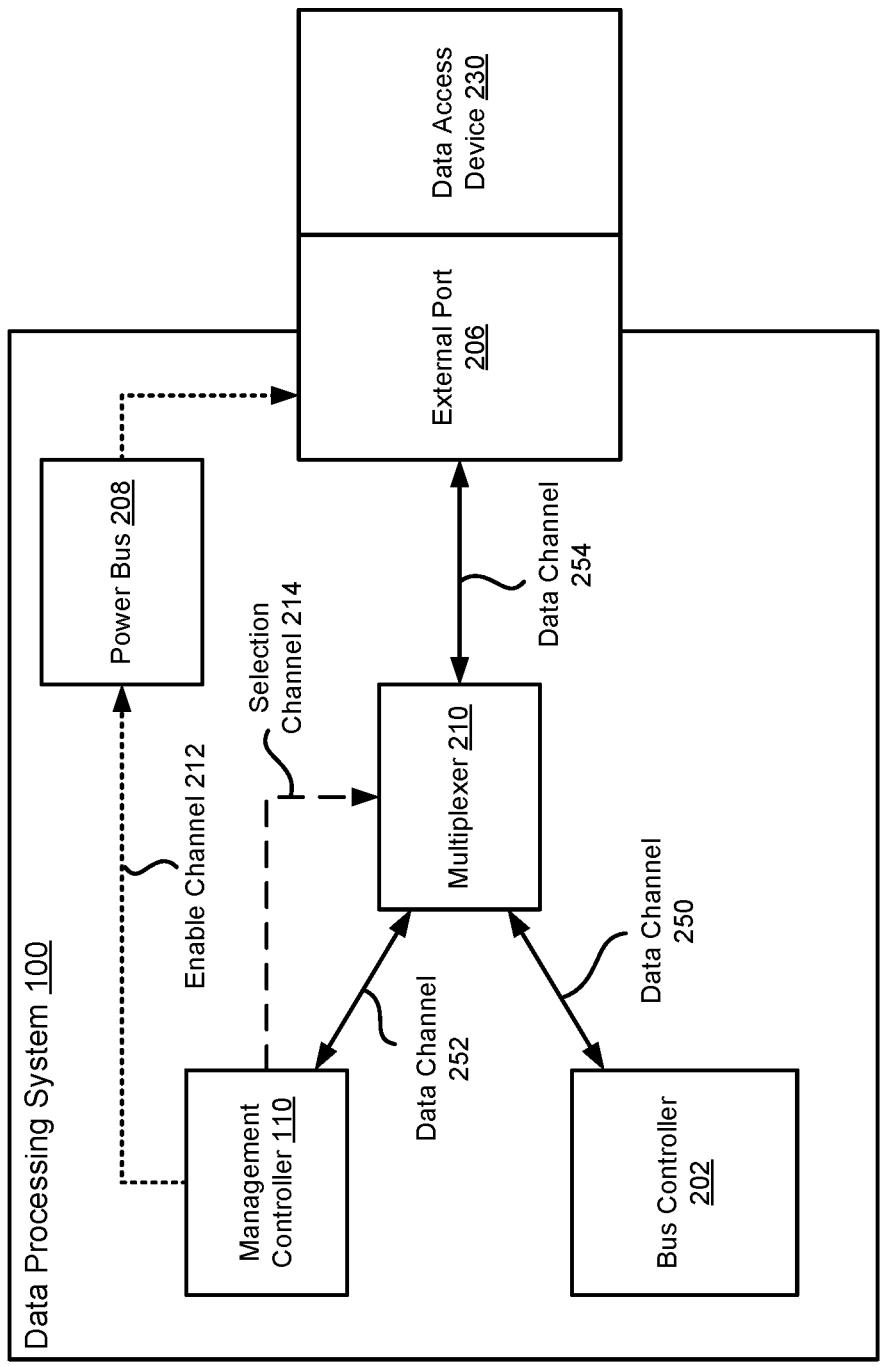
FIGS. 2A-2C show diagrams illustrating connectivity of a system in accordance with an embodiment.
Figure 2B:
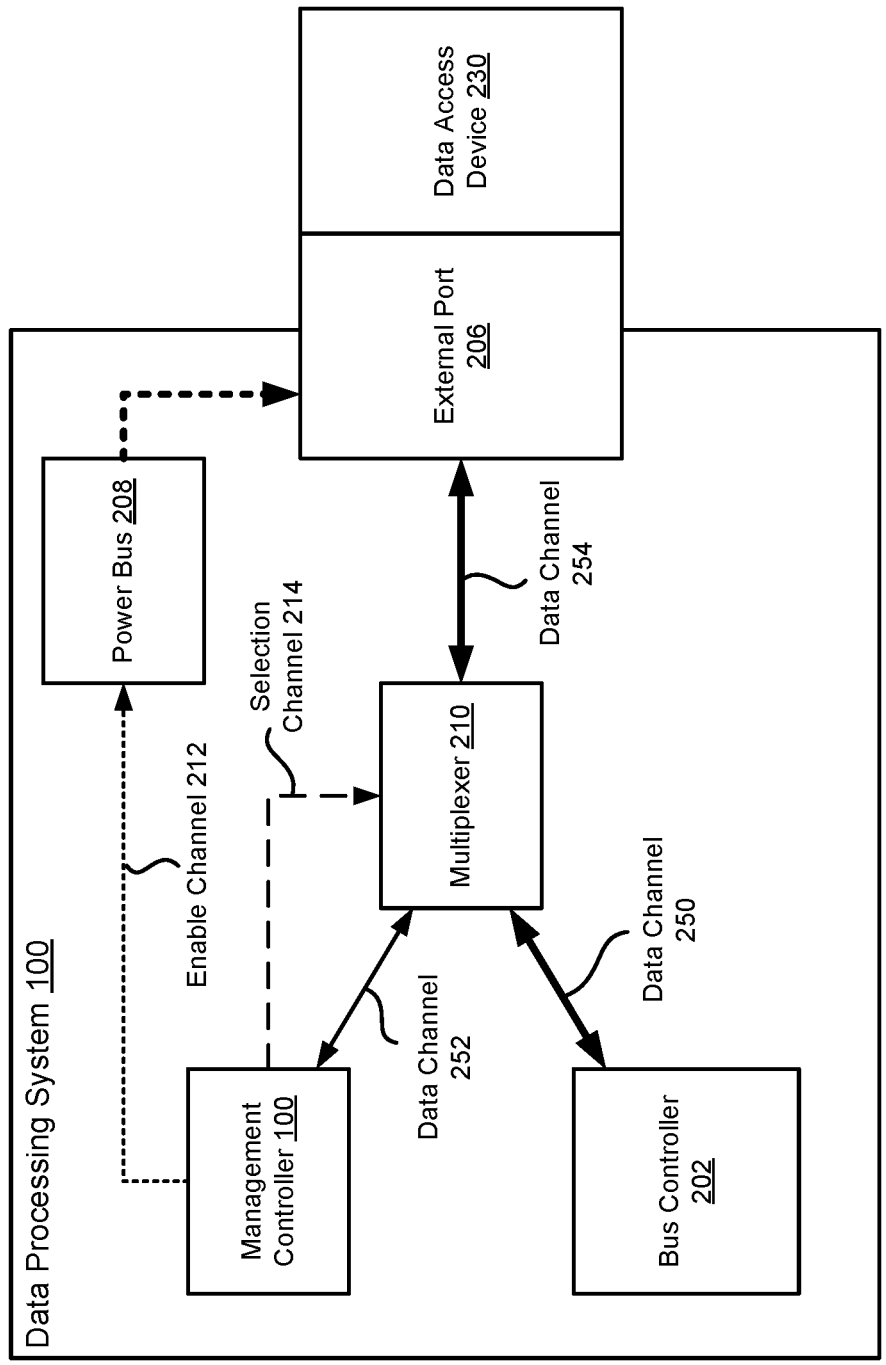
Figure 2C:
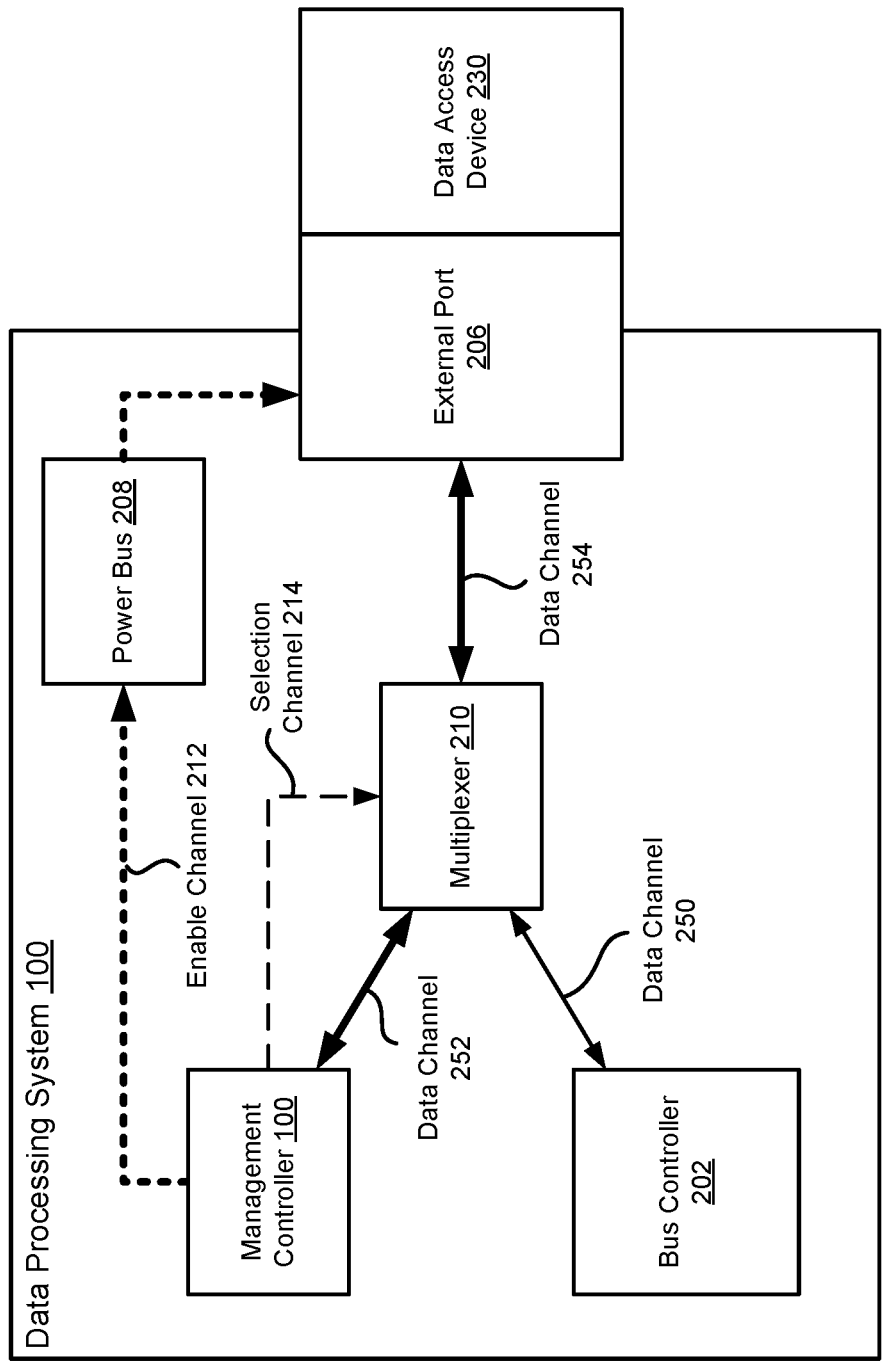

Management controller 110 may include functionality to (i) monitor operation of data processing system 100, (ii) manage the modules of data processing system 100 (e.g., through initiating updates of software hosted by the modules), and/or (iii) take over control of various hardware components of data processing system 100. For example, management controller 110 may include functionality to take over ports of data processing system 100. Refer to FIGS. 2A-2C for additional details regarding taking over control of ports and/or other hardware of data processing system 100.

To manage the operation of data processing system 100, management controller 110 may (i) identify a startup of data processing system, (ii) during the startup, management controller may identify whether any incompatibilities between modules of data processing system 100 exist, (iii) if an incompatibility exists, during the startup data processing system 100 may take over a port of data processing system 100, (iv) using the taken over port, a scan for devices operably connected via the port may be performed, (v) if a device is connected, data accessible via the device may be scanned to identify whether update data (e.g., software images) usable to remediate the identified incompatibility is available, and/or (vi) if update data is available, the update data may be used to remediate the incompatibility and control over the port may be returned to data processing system 100 (or, more specifically, modules of data processing system 100). If no devices are reachable via the port, or if update is unavailable via the devices, then various actions may be performed to attempt to gain access to the update data. For example, control over the port may be retained by the management controller, the startup may be paused or aborted, information may be provided to a user regarding the need for the update data, and/or other types of actions may be performed to gain access to the update data.

By doing so, startups and subsequent operation of data processing system 100 may be more likely to complete successfully even while one or more modules of data processing system 100 are incompatible at a beginning of the startup.

Figure 3:
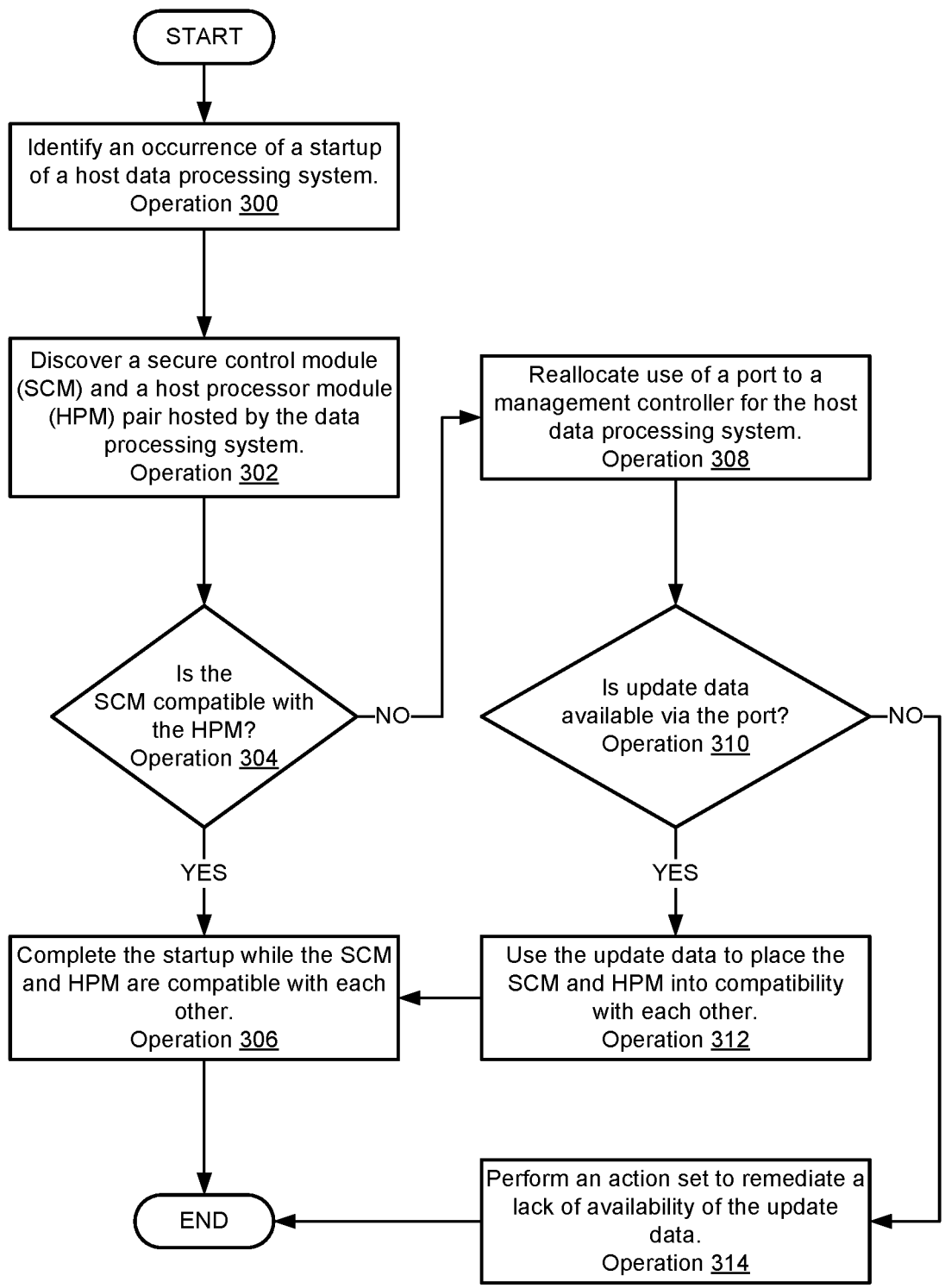
FIG. 3 shows a flow diagram illustrating a method of managing the operation of data processing systems in accordance with an embodiment.

When providing its functionality, data processing system 100 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as included a limited number of specific components, a system in accordance with an embodiment may include fewer, additional, and/or different components than those illustrated therein.

To further clarify embodiments disclosed herein, diagrams illustrating communication paths in accordance with an embodiment are shown in FIGS. 2A-2C.

Turning to FIG. 2A, a first communication topology diagram in accordance with an embodiment is shown. To facilitate communications between external devices and various modules (e.g., 102, 104) and management controller 110, data processing system 100 may include bus controller 202, multiplexer 210, and external port 206. These components may support a set of communication channels usable to operably connect management controller 110 or bus controller 202 to external devices connected to external port 2016. Each of these components is described below.

Bus controller 202 may be an interface controller (e.g., universal serial bus (USB)) that obtains communications via one or more channels (e.g., 254, 250), and provides the communications to a processing complex or other components of one or more modules. Bus controller 202 may be separate from or a part of any of the modules.

External port 206 may include one or more powered ports through which external devices may be operably connected to data processing system 100. For example, external port 206 may include one more receptacles for connectors of the external devices that physically connect the external device and external port 206. External port 206 may also include, for example, powered chips and/or other elements for generating and/or managing electrical signals transmitted from external devices via external port 206. When an electrical signal is received by external port 206, data from the signal may be transmitted to multiplexer 210. Similarly, when data from multiplexer 210 is obtained, external port 206 may generate electrical signals to convey the data to a connected external device.

External port 206 may be powered by power bus 208. Power bus 208 may be managed by management controller 110 and/or other components of data processing system 100. For example, management controller 110 may instruct power bus 208 to provide power to external port 206.

To instruct power bus 208 to power external port 206, management controller 110 may be operably connected to an enable input (e.g., that controls whether power is output based on a high or low signal on the enable input) of power bus 208 via enable channel 212. Consequently, management controller 110 may instruct power bus 208 to provide power to external port 206 (e.g., using a high or low signal). Similar connections (not shown) may exist for other components of data processing system 100 thereby allowing the other components to also manage the power state of external port 206. In FIG. 2A, channels supporting management and distribution of power are illustrated with short dashed lines terminating in at least one arrow, and channels through which data is transmitted are illustrated using solid lines terminating in at least one arrow.

Multiplexer 210 may flexibly place bus controller 202 or management controller 110 in communication with external port 206. For example, to facilitate takeover (e.g., exclusive use) of external port 206 by management controller 110, the configuration of multiplexer 210 may be changed such that bus controller 202 is disconnected and management controller 110 is operably connected to it. To do so, multiplexer 210 may place management controller 110 in operable communication with external port 206 via data channel 252 and data channel 254 (e.g., through signal/data multiplexing). In contrast, to operably connect bus controller 202 to external port 206, multiplexer may perform signal/data multiplexing with respect to data channel 250 rather than data channel 252. Refer to FIGS. 2B-2C for additional details regarding the operable communication channels depending on the configuration of multiplexer 210.

Multiplexer 210 may, therefore, selectively reallocate use of data channel 254 (e.g., a shared channel) to management controller 110 or bus controller 202. For example, multiplexer 210 may reallocate the shared channel to management controller 110 during portions of a startup of data processing system 100.

The configuration of multiplexer 210 may be set using a selection input. The selection input may modify the configuration of multiplexer 210 bas on a signal received at the selection input. To facilitate takeover of external port 206, management controller 110 may be operably connected to the selection input via selection channel 214 (illustrated in FIG. 2A using long dashing). Via selection channel 214, management controller 110 may modify the configuration of multiplexer 210 thereby flexibly modifying the communication topology of data processing system 100.

Any of the channels (e.g., 212, 214, 250, 252, 254) may be implemented using, for example, sets of electrical conductors (e.g., circuit card traces, cabling, etc.) that facilitate transmission of electrical signals.

External port 206 may be implemented, as noted above, using a receptacle. Devices such as data access device 230 may include a corresponding plug that allows for operable connections between external port 206 and the devices to be establish through insertion of the plug into the receptacle. For example, external port 206 may be implemented using a universal serial bus receptacle, of any form factor.

Turning to FIG. 2B, a second communication topology diagram in accordance with an embodiment is shown. The communication topology shown in FIG. 2B may be identical to the topology shown in FIG. 2A. However, to clarify the channels that are active while management controller 100 has not taken over external port 206, the thickness of the lines corresponding to these channels have been increased.

As seen in FIG. 2B, bus controller 202 may be operably connected to external port 206 via a first. The first path may include data channel 250 and data channel 254. In this configuration, a module operably connected to bus controller 202 may have exclusive use of communication via external port 206 (e.g., at least exclusive with respect to management controller 110, other hardware components/modules may also be served by bus controller 202).

To enter this configuration, power bus 208 may power external port 206 and multiplexer 210 may multiplex signals/data from external port 206 obtained via data channel 254 to bus controller 202 via data channel 250.

Turning to FIG. 2C, a third communication topology diagram in accordance with an embodiment is shown. The communication topology shown in FIG. 2C may be identical to the topology shown in FIG. 2A. However, to clarify the channels that are active while management controller 100 has taken over external port 206, the thickness of the lines corresponding to these channels has been increased.

As seen in FIG. 2C, bus controller 202 may not be operably connected to external port 206, but management controller 110 may be operably connected to external port 206 via a second path. The second path may include data channel 252 and data channel 254. In this second configuration, management controller 110 may have exclusive use of communication via external port 206.

To enter the second configuration, power bus 208 may power external port 206 (e.g., based on instructions from management controller 110) and multiplexer 210 may multiplex signals/data from external port 206 obtained via data channel 254 to management controller 110 via data channel 252 (e.g., rather than multiplexing to bus controller 202).

In an embodiment, management controller 110 is implemented using a hardware device including circuitry. The hardware device may be, for example, a digital signal processor, a field programmable gate array, or an application specific integrated circuit. The circuitry may be adapted to cause the hardware device to perform the functionality of management controller 110 such as any of the processes discussed with respect to FIGS. 2A-3. Management controller 110 may be implemented using other types of hardware devices without departing embodiment disclosed herein.

In an embodiment, management controller 110 is implemented using a processor adapted to execute computing code stored on a persistent storage that when executed by the processor performs the functionality of management controller 110 discussed throughout this application such as the processes discussed with respect to FIGS. 2A-3. The processor may be a hardware processor including circuitry such as, for example, a central processing unit, a processing core, or a microcontroller. The processor may be other types of hardware devices for processing information without departing embodiment disclosed herein.

In an embodiment, management controller 110 includes storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed with respect to FIGS. 2A-3. For example, the data structures may include lookup tables usable to identify software versions of and/or other characteristics for modules that are necessary for compatibility with one another. Any of these data structures may be implemented using, for example, lists, tables databases, linked lists, unstructured data, and/or other types of data structures.

As discussed above, the components of FIG. 1 may perform various methods to provide computer implemented services by completing startups (e.g., which may be required to be completed for the computer implemented services to be provided. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method performing a startup of a data processing system in accordance with an embodiment is shown. The method may be performed by data processing system 100, components thereof such as management controllers, or other components of the system shown in FIG. 1. For example, a management controller that operates independent from, manages the operation of, and/or is hosted by a data processing system may perform the method.

At operation 300, an occurrence of a startup of a data processing system is identified. The identification may be made by tracking a state of the data processing system. The state may be tracked by, for example, receiving information regarding the state from components of the data processing system, monitoring power applied to components of the data processing system, and/or via other methods.

At operation 302, a secure control module and a host processor module hosted by the data processing system are discovered. The secure control module and host processor module may be a pair that may need to be compatible with one another for nominal operation of the data processing system. The secure control module and host processor module may be discovered by, for example, receiving information regarding these components from an entity (e.g., a basic input output system) tasked with managing the startup, by performing one or more actions to identify the presence of the secure control module and the host processor module, and/or via other methods.

At operation 304, a determination is made regarding whether the secure control module is compatible with the host processor module. The determination may be made by identifying hardware components and/or software hosted by the modules, and identifying whether the software is operable with the modules. The identification may be made, for example, by performing a lookup in a data structure. The data structure may specify software (e.g., versions) that is compatible with various modules, hardware components of the modules, and/or software hosted by the modules. If the software is identified as not being compatible, then the secure control module may be determined to not be compatible with the host processor module.

If the secure control module is compatible with the host processor module, the method may proceed to operation 306. Otherwise, the method may proceed to operation 308.

At operation 306, the startup is completed. For example, the startup already being performed may be allowed to continue and may be completed without changes to the data processing system.

The method may end following operation 306.

Returning to operation 306, the method may proceed to operation 308 following operation 306 when it is determined that the secure control module is not compatible with the host processor module. Proceeding to operation 308 may cause the startup to be suspended, paused, and/or otherwise interrupted from a typical flow.

At operation 308, use of a port is reallocated to a management controller for the host data processing system. The port may be reallocated by performing a takeover of the port by the management controller. To perform the takeover, the management controller may (i) power the port, and (ii) modifying a configuration of a multiplexer that selectively operably connects a shared channel to the management controller and a bus controller. The modified configuration may disconnect the shared channel from the bus controller and operably connecting the shared channel to the management controller.

The port may be powered by instructing a power bus to power the port. The port may be, for example, a universal serial bus (USB) port to which various devices may be operably connected. These devices may include, for example, mass storage devices, network devices (e.g., wired and/or wireless network adapters), and/or other types of devices.

The configuration of the multiplexer may be modified by, for example, providing a signal that indicates the configuration to the multiplexer. For example, the signal may be provided to a select input of the multiplexer that controls how it multiplexes signals.

At operation 304, a determination is made regarding whether update data is available via the port. The determination may be made by (i) identifying whether a device is connected to the port, (ii) if a device is connected to the port, identifying a type of the device, and (iii) if a device is connected to the port, performing an action set based on the type of the device to identify whether the update data is available.

If no device is connected to the port, then it may be determined that update data is not yet available. While no device is connected to the port, the management controller may wait for a period of time or otherwise provide an opportunity for a device to be connected to the port. Once a criteria (e.g., duration of time, user input indicating that no device will be connected, etc.)) is met without a device being connected, then it may be determined that the update data is not available via the port.

If a device is connected to the port, then the type of the device may be identified and a corresponding action set may be performed. The device type may be, for example, a mass storage device, a network device (e.g., that operates as a network interface), or other types of devices.

If the device is a mass storage device, then the action set may include scanning data structures hosted by the device for the update data. If the update data is not present, then management controller may wait for a period of time or otherwise provide an opportunity for a device through which the update data may be obtained to be connected to the port. Once the criteria (e.g., duration of time, user input indicating that no device will be connected, quantity of devices attached to the port, etc.)) is met without a device being connected, then it may be determined that the update data is not available via the port.

If the device is a network device, then the action set may include (i) using the network device to operably connect to another device (e.g., via a network accessible via the network device). The other device may be, for example, a server, file storage, etc. The process of connecting may include performing various security related actions such validating the other device, setting up a secure connection (e.g., encrypted), etc.

Once connected, the management controller may scan data structures hosted by the other device. If the update data is not present in the data structures hosted by the other device, then management controller may wait for a period of time or otherwise provide an opportunity for a device through which the update data may be obtained to be connected to the port. Once the criteria (e.g., duration of time, user input indicating that no device will be connected, quantity of devices attached to the port, etc.)) is met without a device being connected, then it may be determined that the update data is not available via the port.

If the update data is accessible via a device connected to the port, then it may be determined that the data is available via the port.

The update data may include, for example, software images, binary files, and/or other data usable to modify the operation of one or more hardware components of modules of the data processing system. The update may be identified, for example, based on the lookup performed in operation 302 which may specify software necessary to be hosted by the secure control module and/or host processor module for these modules to be compatible for each other. In other words, the update data may include data structures usable to flash or otherwise update firmware of one of the modules for compatibility with at least one other module.

If it is determined that the update data is available via the port, then the method may proceed to operation 312. Otherwise, the method may proceed to operation 314.

At operation 314, the update data is used to place the secure control module and the host processing module into compatibility with each other. The update may be used by, for example, flashing or otherwise modifying software (e.g., firmware) hosted by one of the modules. For example, the update data may include a software image usable to flash a field programmable gate array (or other programmable device) of one of the modules. Doing so may modify the subsequent operation of the module.

Once the operation of the modules is updated, various actions to place the data processing system into condition for normal operation may be performed. For example a virtual (or actual) power cycling of the data processing system may be performed, the port may be reallocated back to the bus controller, records of the changes may be generated/stored/distributed, etc.

By performing operation 312, an updated pair of the secure control module and the host processor module may be obtained. The pair may be compatible with one another (e.g., by hosting software that is compatible.

The method may proceed to operation 306 following operation 312.

Returning to operation 310, the method may proceed to operation 314 following operation 310 if update data is not available via the port.

At operation 314, an action set to remediate a lack of availability of the update data is performed. The actions set may include, for example, notifying an administrator, aborting or indefinitely delaying the startup, recording that a failure of the startup has occurred, displaying information indicating that the startup cannot be completed, displaying information indicating that various modules need to be updated (e.g., flashed) before the startup may be completed, etc.

The method may end following operation 314.

Using the method illustrated in FIG. 3, a system in accordance with an embodiment may be more likely to continue complete startups thereby allowing computer implemented services to be subsequently provided. By doing so, the usability of a data processing system may be improved.

Figure 4:
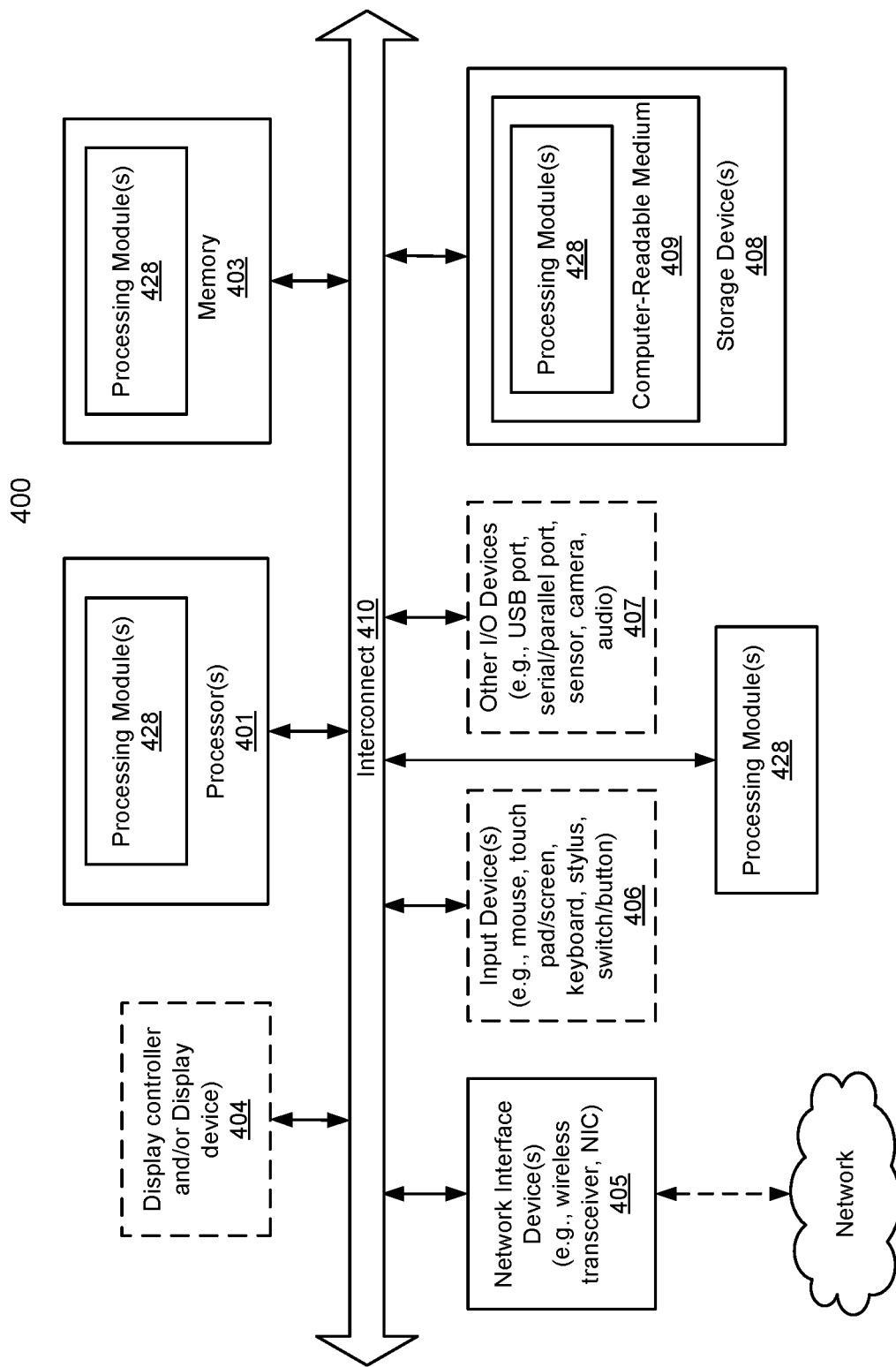
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
   identifying an occurrence of a startup of the data processing system;
   based on the occurrence and while the startup is being performed:
      performing a discovery process to identify:
         a secure control module of the data processing system, and
         a host processor module of the data processing system;
      making a first determination regarding whether the secure control module is compatible with the host processor module;
      in a first instance of the first determination where the secure control module is not compatible with the host processor module:
         reallocating use of a port of the data processing system to a management controller for the data processing system;
         making a second determination, using the port while the port is allocated to the management controller, regarding whether update data is available using the port;
         in a first instance of the second determination where the update data is available via the port:
            placing the secure control module and the host processor module into compatibility with each other using the update data to obtain an updated secure control module and host processor module pair; and
            completing the startup using the updated secure control module and host processor module pair.

2. The method of claim 1, further comprising:
   in a second instance of the first determination where the secure control module is compatible with the host processor module:
      completing the startup using the secure control module and the host processor module.

3. The method of claim 2, further comprising:
   in a second instance of the second determination where the update data is not available via the port:
      aborting the startup; and
      performing an action set to remediate a lack of availability of the update data.

4. The method of claim 1, wherein reallocating use of the port of the data processing system to the management controller for the data processing system comprises:
   modifying a configuration of a multiplexer positioned between a shard communication channel to the port and the management controller, the modified configuration of the multiplexer operably connecting the management controller to the shared communication channel and disconnecting bus controller for of the data processing system from the shared communication channel.

5. The method of claim 4, wherein the port is a universal serial bus port.

6. The method of claim 5, wherein making the second determination comprises:
   making a third determination regarding whether a device is operably connected to the port;
   in a first instance of the third determination where the device is operably connected to the port:
      identifying a type of the device operably connected to the port; and performing an action set based on the type of the device to identify whether the update data is available via the device.

7. The method of claim 6, wherein in a first instance of the performance of the action set where the type of the device is a mass storage device, the action set comprises:
scanning data stored on the mass storage device for the update data.

8. The method of claim 7, wherein in a second instance of the performance of the action set where the type of the device is a network device, the action set comprises:
operably connecting to a second device using the network device; and
scanning data stored on the second device for the update data.

9. The method of claim 1, wherein placing the secure control module and the secure processing module into compatibility with each other comprises:
updating operation of the secure control module using the update data.

10. A non-transitory machine-readable medium having instructions stored therein, which when executed by a processor, cause the processor to perform operations for managing operation of a data processing system, the operations comprising:
identifying an occurrence of a startup of the data processing system;
based on the occurrence and while the startup is being performed:
performing a discovery process to identify:
a secure control module of the data processing system, and
a host processor module of the data processing system;
making a first determination regarding whether the secure control module is compatible with the host processor module;
in a first instance of the first determination where the secure control module is not compatible with the host processor module:
reallocating use of a port of the data processing system to a management controller for the data processing system;
making a second determination, using the port while the port is allocated to the management controller, regarding whether update data is available using the port;
in a first instance of the second determination where the update data is available via the port:
placing the secure control module and the host processor module into compatibility with each other using the update data to obtain an updated secure control module and host processor module pair; and
completing the startup using the updated secure control module and host processor module pair.

11. The non-transitory machine-readable medium of claim 10, wherein the operations further comprise:
in a second instance of the first determination where the secure control module is compatible with the host processor module:
completing the startup using the secure control module and the host processor module.

12. The non-transitory machine-readable medium of claim 11, wherein the operations further comprise:
in a second instance of the second determination where the update data is not available via the port:
aborting the startup; and
performing an action set to remediate a lack of availability of the update data.

13. The non-transitory machine-readable medium of claim 12, wherein reallocating use of the port of the data processing system to the management controller for the data processing system comprises:
modifying a configuration of a multiplexer positioned between a shard communication channel to the port and the management controller, the modified configuration of the multiplexer operably connecting the management controller to the shared communication channel and disconnecting bus controller for of the data processing system from the shared communication channel.

14. The non-transitory machine-readable medium of claim 13, wherein the port is a universal serial bus port.

15. The non-transitory machine-readable medium of claim 14, wherein making the second determination comprises:
making a third determination regarding whether a device is operably connected to the port;
in a first instance of the third determination where the device is operably connected to the port:
identifying a type of the device operably connected to the port; and
performing an action set based on the type of the device to identify whether the update data is available via the device.

16. The non-transitory machine-readable medium of claim 15, wherein in a first instance of the performance of the action set where the type of the device is a mass storage device, the action set comprises:
scanning data stored on the mass storage device for the update data.

17. The non-transitory machine-readable medium of claim 16, wherein in a second instance of the performance of the action set where the type of the device is a network device, the action set comprises:
operably connecting to a second device using the network device; and
scanning data stored on the second device for the update data.

18. The non-transitory machine-readable medium of claim 10, wherein placing the secure control module and the secure processing module into compatibility with each other comprises:
updating operation of the secure control module using the update data.

19. A data processing system, comprising:
a secure control module;
a host processor module;
a management controller comprising:
a processor;
a memory coupled to the processor to store instructions, which when executed by the processor, cause the processor to perform operation, the operations comprising:
identifying an occurrence of a startup of the data processing system;
based on the occurrence and while the startup is being performed:
performing a discovery process to identify:
the secure control module, and
the host processor module;

making a first determination regarding whether the secure control module is compatible with the host processor module;

in a first instance of the first determination where the secure control module is not compatible with the host processor module:

reallocating use of a port of the data processing system to a management controller for the data processing system;

making a second determination, using the port while the port is allocated to the management controller, regarding whether update data is available using the port;

in a first instance of the second determination where the update data is available via the port:

placing the secure control module and the host processor module into compatibility with each other using the update data to obtain an updated secure control module and host processor module pair; and completing the startup using the updated secure control module and host processor module pair.

20. The data processing system of claim 19, wherein the operations further comprise:

in a second instance of the first determination where the secure control module is compatible with the host processor module:

completing the startup using the secure control module and the host processor module.

* * * * *